US011866353B2

United States Patent
Judy

(10) Patent No.: US 11,866,353 B2
(45) Date of Patent: Jan. 9, 2024

(54) METHODS OF SEPARATING ULTRAFINE POLLUTANT PARTICLES FROM AQUEOUS SUSPENSION

(71) Applicant: University of Florida Research Foundation, Inc., Gainesville, FL (US)

(72) Inventor: Jonathan Judy, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 222 days.

(21) Appl. No.: 17/241,340

(22) Filed: Apr. 27, 2021

(65) Prior Publication Data

US 2021/0387875 A1 Dec. 16, 2021

Related U.S. Application Data

(60) Provisional application No. 63/038,453, filed on Jun. 12, 2020.

(51) Int. Cl.
*C02F 1/48* (2023.01)
*B82Y 25/00* (2011.01)
(Continued)

(52) U.S. Cl.
CPC ............. *C02F 1/481* (2013.01); *B82Y 25/00* (2013.01); *B82Y 30/00* (2013.01); *B82Y 40/00* (2013.01);
(Continued)

(58) Field of Classification Search
CPC ............. C02F 1/481; C02F 2101/105; C02F 2101/203; C02F 2103/001; C02F 2303/18;
(Continued)

(56) References Cited

U.S. PATENT DOCUMENTS 3,498,455 A * 3/1970 Kirby ................. B03C 1/28
                  210/222
7,665,546 B2 * 2/2010 Ruttley ............... H01F 7/0221
                  210/695
(Continued)

FOREIGN PATENT DOCUMENTS

CN    105693004 A * 6/2016 ............... C02F 9/12
CN    106336070 A * 1/2017 ............... C02F 9/12
(Continued)

OTHER PUBLICATIONS

Nanoscopic_ntrev-2012-0051.pdf (Year: 2012).*
(Continued)

*Primary Examiner* — Ekandra S. Miller-Cruz
(74) *Attorney, Agent, or Firm* — Thomas|Horstemeyer LLP.

(57) ABSTRACT

The present disclosure provides for methods and systems for separating ultrafine particulate pollutants from aqueous suspensions. The present disclosure provide for methods and systems that can reduce the amount of ultrafine particulate pollutants from aqueous solutions, for example storm water runoff, which are not readily or easily removed using current state of the art techniques. In general, methods of the present disclosure provide for removing a portion of target ultrafine particulate pollutants using magnetic nanoparticles, which form aggregates with the ultrafine particulate pollutants. After a time period a magnetic field is applied and the aggregate can be separated from the aqueous suspension. Subsequently, the aggregates can be broken down and the magnetic nanoparticles recycled or reused while the ultrafine particulate contaminants are further processed, recycled, or disposed of.

10 Claims, 1 Drawing Sheet

(51) Int. Cl.
*B82Y 30/00* (2011.01)
*C02F 103/00* (2006.01)
*C02F 101/20* (2006.01)
*C02F 101/10* (2006.01)
*B82Y 40/00* (2011.01)

(52) U.S. Cl.
CPC .. *C02F 2101/105* (2013.01); *C02F 2101/203* (2013.01); *C02F 2103/001* (2013.01); *C02F 2303/18* (2013.01)

(58) Field of Classification Search
CPC ...... C02F 1/281; C02F 2303/16; C02F 1/488; C02F 2305/08; B82Y 25/00; B82Y 30/00; B82Y 40/00; H01F 1/0054
USPC .......................................................... 210/223
See application file for complete search history.

(56) References Cited

U.S. PATENT DOCUMENTS

| | | | | |
|---|---|---|---|---|
| 8,945,393 | B2* | 2/2015 | Zahn ..................... | C02F 1/488 210/671 |
| 2008/0073283 | A1* | 3/2008 | Cort ......................... | B03C 1/01 210/695 |
| 2011/0017664 | A1* | 1/2011 | Conner .................... | C02F 3/08 210/150 |
| 2012/0103913 | A1* | 5/2012 | Kiyoto ..................... | H01F 1/44 556/29 |
| 2018/0044595 | A1* | 2/2018 | Mazyar ................... | C10G 1/047 |

FOREIGN PATENT DOCUMENTS

| | | | | |
|---|---|---|---|---|
| CN | 108557927 | A * | 9/2018 | ............... C02F 1/00 |
| JP | H076912 | A * | 1/1995 | ................ H01F 1/11 |
| JP | 2001259657 | A * | 9/2001 | ............. C02F 1/488 |

OTHER PUBLICATIONS

Ultrafine_definition_NPL_webster.pdf (Year: 2023).*
Yang_CN106336070A_translated.pdf (Year: 2017).*
Zhang_CN108557927A_translated.pdf (Year: 2018).*
Luo_CN105693004A_translated.pdf (Year: 2016).*
Translation of Tamaura (JP-2001259657-A) (Year: 2001).*
Translation of Tanaka (JP-H076912-A) (Year: 1995).*
Samuel C.N. Tang, Irene M.C. Lo, Department of Civil and Environmental Engineering, The Hong Kong University of Science and Technology, Hong Kong, China, Magnetic nanoparticles: Essential factors for sustainable environmental applications, Water Research 47 (2013) 2613-2632.

* cited by examiner

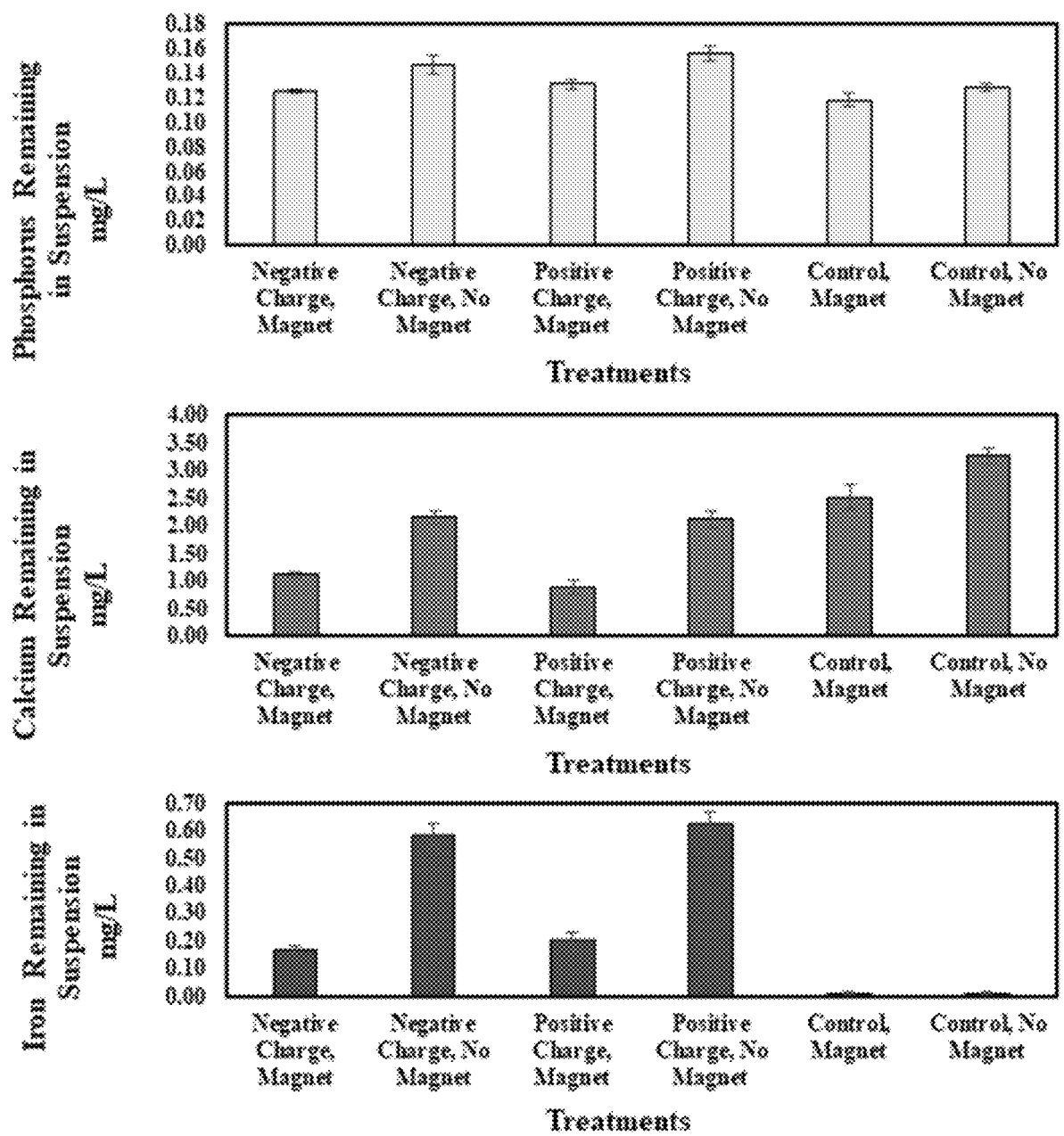

METHODS OF SEPARATING ULTRAFINE POLLUTANT PARTICLES FROM AQUEOUS SUSPENSION

CLAIM OF PRIORITY TO RELATED APPLICATION

This application claims priority to U.S. provisional application entitled "METHODS OF SEPARATING ULTRAFINE POLLUTANT PARTICLES FROM AQUEOUS SUSPENSION" having Ser. No. 63/038,453 filed on Jun. 12, 2020, which is entirely incorporated herein by reference.

BACKGROUND

Removing small amounts of ultrafine particles from large volumes of water is a significant technical challenge. Approaches such as filtration are not feasible in all contexts, such as managing ultrafine contaminants in treatment wetland effluent. As a result, there is a need in the industry to address these technical challenges.

SUMMARY

Embodiments of the present disclosure provide for methods and systems for separating ultrafine particulate pollutants from aqueous suspensions. Embodiments of the present disclosure provide for methods and systems that can reduce the amount of ultrafine particulate pollutants from aqueous solutions, for example storm water runoff, which are not readily or easily removed using current state of the art techniques. In particular the methods and systems of the present disclosure can be used in municipal wastewater treatment and in water management.

In an aspect, the present disclosure provides for methods for removing ultrafine particulate pollutants, comprising: introducing a plurality of magnetic nanoparticles to an aqueous suspension that includes a dispersion of target ultrafine particulate pollutants, forming an aggregate of the magnetic nanoparticles and the target ultrafine particulate pollutants; applying a magnetic field to the aqueous suspension; and separating the aggregate from the aqueous suspension. The magnetic nanoparticles can be positively charged magnetic nanoparticles or negatively charged magnetic nanoparticles or a mixture thereof. The magnetic nanoparticles can include magnetite, maghemite, pure metals, ferromagnets, metal allays, or a combination thereof. The separating step of the method can include removing about 25 percent or more of the target ultrafine particulate pollutant from the aqueous suspension.

In an aspect, the present disclosure provides for systems for removing ultrafine particulate pollutants from an aqueous suspension, comprising: a structure configured to introduce a plurality of magnetic nanoparticles to an aqueous suspension that includes a dispersion of target ultrafine particulate pollutants, wherein if the aqueous suspension includes one or more target ultrafine particulate pollutants, the target ultrafine particulate pollutants form an aggregate with the magnetic nanoparticles; and a magnetic device including a magnet that is configured to apply a magnetic field to the aqueous suspension for a time period to remove the aggregate from the aqueous suspension. The system can be configured to flow the aqueous suspension across the magnet. The recovery device can be configured to separate the magnetic nanoparticles from the target ultrafine particulate pollutants by breaking down the aggregates.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1 illustrates graphs that show changes in suspended P (top), Ca (middle), and Fe (bottom) after 15 seconds of settling.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, environmental engineering, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by volume, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequences where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

Discussion

In accordance with the purpose(s) of the present disclosure, embodiments of the present disclosure provide for methods and systems for separating ultrafine particulate pollutants from aqueous suspensions. Embodiments of the present disclosure provide for methods and systems that can reduce the amount of ultrafine particulate pollutants from aqueous solutions, for example storm water runoff, which are not readily or easily removed using current state of the art techniques. Studies indicate a significant reduction in the ultrafine particulate pollutants amounts that remain in the aqueous suspension using the methods of the present disclosure. The technology described herein could have numerous applications with significant societal impacts, for example, use in municipal wastewater treatment and in water management practices for surface waters such as those feeding into lakes, rivers, estuaries, marsh, swamp, and the like. Embodiments of the method can be used to reduce the amount of particulate contaminant associated with agricultural fertilizers, manure, inorganic and organic contaminants and organic wastes in sewage and industrial effluents. In particular, methods of the present disclosure can be used to remove portions of ultrafine particulate pollutants such as those related to phosphorous as well as other nutrient contaminants, which can cause eutrophication.

In general, methods of the present disclosure provide for removing a portion of target ultrafine particulate pollutants using magnetic nanoparticles, which form aggregates with the ultrafine particulate pollutants. After a time period (e.g., seconds to minutes), a magnetic field is applied and the aggregate can be separated from the aqueous suspension. In particular, a rare earth magnet can be used to remove aggregates including the ultrafine particulate contaminants from the aqueous suspension. Subsequently, the aggregates can be broken down and the magnetic nanoparticles recycled or reused whole the ultrafine particulate contaminants are further processed, recycled, or disposed of.

Prior to aggregation with the magnetic particles, the aqueous suspension can include one or more types of target ultrafine particulate pollutants, which can include: trace organics and dissolved nutrients/metal ions (e.g., P, N, or compounds thereof) sorbed to the surfaces of particulates of any type, particulate mineral phases composed of regulated contaminants such as lead minerals and particulate nutrients phases, and the like. The target ultrafine particulate pollutants are smaller than 1 micrometer in one dimension.

Now having described aspects of the present disclosure generally, additional details are provided. The method for removing (e.g., reducing the amount present by 20% or more, about 40% or more, or about 50% or more relative to the amount prior to treatment) ultrafine particulate pollutants from a defined amount of the aqueous suspension can include introducing a plurality of magnetic nanoparticles to an aqueous suspension that includes a dispersion of target ultrafine particulate pollutants. The magnetic nanoparticles and ultrafine particulate pollutants can be mixed in a static body of fluid or can be mixed in a non-static (e.g., the fluid is flowing) manner. In an aspect, the magnetic nanoparticles can be poured into the aqueous suspension and/or the aqueous suspension can be flowed over or through an environment including the magnetic nanoparticles.

Once the magnetic nanoparticles are mixed with the aqueous suspension, aggregates of the magnetic nanoparticles and the target ultrafine particulate pollutants are formed. Once the aggregates are formed, the aggregates can have a wide range of sizes from sub-micron to many microns to larger sizes.

After the formation of the aggregates, a magnetic field can be applied to the aqueous suspension for a time frame. The time frame can be on the scale of seconds (e.g., 15 second to 45 seconds), minutes (e.g., about 1 minutes to 10 minutes or more), or longer for larger bodies of fluid, where the time frame is at least partially influenced by the amount of fluid and the type and amount of contaminants as well as the type and amount of magnetic particles. The magnetic field can include introducing a rare earth magnet (e.g., NdFeB) to the aqueous suspension and removal of the rare earth magnet or the rare earth magnet can be stationary and the aqueous fluid flowed into a chamber including the rare earth magnet.

Subsequently, the aggregate can be separated from the aqueous suspension. Depending upon the setup, the aqueous suspension can be removed from the rare earth magnet or the rare earth magnet can be removed from the aqueous suspension. The aggregate can then be separated from the rare earth magnet and properly disposed of or recycled (e.g. recovery of the magnetic nanoparticles from the aggregate and used again). For example, the aggregates can be broken down so that the magnetic nanoparticles can be recovered and reused, while the target ultrafine particulate pollutants can be disposed of or recycled.

The magnetic nanoparticles can be synthesized with a variety of surface chemistries, including those conferring positive (e.g. amine functional group) or negative (e.g. carboxylic functional group) charges and the surface chemistry can be modified to address specific contaminants with specific surface chemistry. To address a heterogenous mixture of contaminant phases, the magnetic nanoparticle treatment could be a mixture of positively charged and negatively charged magnetic nanoparticles. The magnetic nanoparticles are comprised of magnetite (($Fe_3O_4$)), maghemite ($\gamma$-$Fe_2O_3$), pure metals (e.g., Fe and Co), ferromagnets (e.g., $MgFe_2O_4$, $MnFe_2O_4$, and $CoFe_2O_4$,) as well as metal alloys (e.g., $CoPt_3$ and FePt) nanoparticles, or a combination thereof. The magnetic nanoparticles can have a longest dimension (e.g., diameter, width, length) of about 10 nm to 500 nm. The shape of the magnetic nanoparticles can be spherical, conical, polygonal, non-spherical, or random. The magnetic particles used can be of a uniform size and shape or of random sizes and/or shapes.

When embodiments of the method include a mixture of negatively charged magnetic nanoparticles and positively charged magnetic nanoparticles, the applied magnetic field can be alternating the magnetic field, where separating the aggregate can be performed between alternating the magnetic field.

In an aspect, the present disclosure provides for systems for removing ultrafine particulate pollutants from an aqueous suspension. In one aspect, the system can implement the methods described herein. In an aspect, the system can include a structure that is configured to introduce a plurality of magnetic nanoparticles to an aqueous suspension that includes a dispersion of target ultrafine particulate pollutants. For example, the device can be structure designed to introduce (e.g., flow, dump, etc.) a certain amount (e.g., meter) to the aqueous suspension based on the amount of aqueous suspension present, the type of magnetic nanoparticles, the type and/or amount of target ultrafine particulate pollutants, and the like. The system also includes a magnetic device include a magnet such as those described herein. The magnetic device is configured to apply a magnetic field to the aqueous suspension for a time period, such as those provided herein, to remove the aggregate from the aqueous suspension. The system can be floating structure such as a barge, boat, or other type floating structure that includes the structure to introduce the plurality of magnetic nanoparticles and the magnetic system. In an example, the floating structure can flow the aqueous suspension (e.g., water that may include the target ultrafine particulate pollutants) into an area where the structure can introduce the plurality of magnetic nanoparticles. The system can include other components to store the magnetic nanoparticles, systems to transport the various components, pumps, other infrastructure to operate the various components, and the like. After a period of time, the magnetic system can use the magnet to remove the aggregates and the remaining fluid can be flowed out. This can be a flow or batch process. This can be repeated as necessary. This system can operate in a continuous or batch mode. The system can also include a recovery device configured to separate the magnetic nanoparticles from the target ultrafine particulate pollutants by breaking down the aggregates. In this way, the plurality of magnetic nanoparticles can be recycled or reused.

EXAMPLES

Now having described the embodiments of the present disclosure, in general, example 1 describes some additional embodiments of the present disclosure. While embodiments of the present disclosure are described in connection with example 1 and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Removing small amounts of ultrafine particles from large volumes of water is a significant technical challenge. Approaches such as filtration are not feasible for large volumes of water, such as would be associated with municipal water treatment effluent. Contexts exists where developing a method to remove small concentrations of ultrafine particles would have substantial value.

One such example would be the presence of a contaminant or nutrient that associates with ultrafine particles and that also may have environmental or human health impacts at extremely low concentrations. For example, in Florida, phosphorus from human activity is a long-term threat to the relatively sensitive ecosystems found in the Everglades. Constructed wetlands have been engineered upstream of the Everglades with the goal of reducing nutrient discharge into the Everglades. This approach has reduced phosphorus entering the Everglades substantially. However, the South Florida Water District continues to struggle to achieve desired phosphorus levels in waters leaving these engineered wetlands.

This example provides an approach and supportive data that describe an approach to remove small amounts of ultrafine contaminants from suspension. In environmental waters, ultrafine particles often aggregate together to form larger, but still fine aggregates. One approach described herein to address this challenge is to introduce magnetic nanoparticles to a suspension containing environmental ultrafines (including the contaminants/nutrients that ideally would be removed (e.g., phosphorous based compounds and other compounds associated with the target particles)). The magnetic nanoparticles and environmental ultrafines will then aggregate together within a controlled or known volume, such as a reaction cell, containing a magnet(s), which remove the aggregated ultrafines and magnetic nanoparticles. While it has been discussed that aggregation is a negative attribute, the approach provided herein uses this feature as an advantage.

Experiments have been conducted that examine this approach. Also variables were investigated regarding the charge on the nanoparticles, as the interaction between the charges on the surface of the nanoparticles with those on the surface of the environmental ultrafines may influence aggregation. The data collected is in regard to ultrafine fraction of solids within a sample of soil collected from one of the constructed wetlands that protect the Everglades. The ultrafines were suspended in water, they were then subjected to one of 6 treatments, and then measurements were made regarding the content for phosphorus (the nutrient to be removed), calcium (a major constituent of the particulates in these samples), and iron (tracer for the nanoparticles).

The treatments included:
Negatively-charged magnetic nanoparticles, reaction vessel equipped with magnet
Negatively-charged magnetic nanoparticles, reaction vessel NOT equipped with magnet
Positively-charged magnetic nanoparticles, reaction vessel equipped with magnet
Positively-charged magnetic nanoparticles, reaction vessel NOT equipped with magnet
Control 1 (no nanoparticles, reaction vessel equipped with magnet)
Control 2 (no nanoparticles, reaction vessel NOT equipped with magnet)

The experiments revealed that after just 15 seconds, both the positively and negatively charged magnetic nanoparticles significantly reduced the calcium (>50%) and phosphorus (~20-25%) remaining in suspension (FIG. 1). There were no significant differences observed between the two different nanoparticle charges, possibly as a result of the environmental particulates having both negative and positively charged sites. Critically, this suggests that a variety of different magnetic nanoparticles would be effective, easing the difficulty/cost associated with synthesizing the necessary nanomaterials.

The experiment was conducted with a relatively high concentration of particulates and this approach may have been more effective in a more dilute sample more representative of the water leaving the constructed wetlands. Other parameters that could be considered include the type of nanoparticle, particle concentration ratio, contact time etc. Regardless, even the non-optimized amount of phosphorus reduction (20-25%) observed here would be of substantial value.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

The invention claimed is:

1. A method for removing ultrafine particulate pollutants, comprising: introducing a plurality of magnetic nanoparticles to an aqueous suspension that includes a dispersion of target ultrafine particulate pollutants, wherein the magnetic nanoparticle has a longest dimension of about 10 nm to 500 nm, wherein the target ultrafine particulate pollutants comprise phosphorous sorbed onto a surface of the target ultrafine particulate pollutants, wherein the target ultrafine particulate pollutant has a longest dimension of about 10 nm to 1 micron, wherein the aqueous suspension is storm water runoff, sewage, industrial effluent, or a combination thereof, forming an aggregate of the magnetic nanoparticles and the target ultrafine particulate pollutants; flowing the aggregate across a magnet; separating the aggregate from the aqueous suspension as the aggregate flows across the magnet, wherein the aggregate is magnetically attached to the magnet, wherein separation of the aggregate from the aqueous suspension forms a treated aqueous suspension; and flowing the treated aqueous suspension into a lake, a river, an estuary, a marsh, or a swamp.

2. The method of claim 1, wherein the magnetic nanoparticles are positively charged magnetic nanoparticles.

3. The method of claim 1, wherein the magnetic nanoparticles are negatively charged magnetic nanoparticles.

4. The method of claim 1, wherein the magnetic nanoparticles comprise magnetite, maghemite, pure metals, ferromagnets, metal alloys, or a combination thereof.

5. The method of claim 4, wherein the ferromagnet s selected from: $MgFe_2O_4$, $MnFe_2O_4$, or $CoFe_2O_4$.

6. The method of claim 4, wherein the metal alloy is selected from $CoPt_3$ or FePt.

7. The method of claim 4, wherein the magnetic nanoparticle includes one or more ligands attached to the magnetic nanoparticle to form a charge to the magnetic nanoparticle.

8. The method of claim 1, wherein separating includes removing about 25 percent or more of the target ultrafine particulate pollutant from the aqueous suspension.

9. The method of claim 1, wherein the magnet is a rare earth magnet.

10. The method of claim 1, wherein the aqueous suspension is industrial effluent and wherein the target ultrafine particulate pollutants comprise phosphorous based compounds associated with fertilizers.

* * * * *